June 3, 1958 G. M. SCHUEDER 2,837,039
FREIGHT LOADING CROSS BAR
Filed Feb. 24, 1955 2 Sheets-Sheet 1
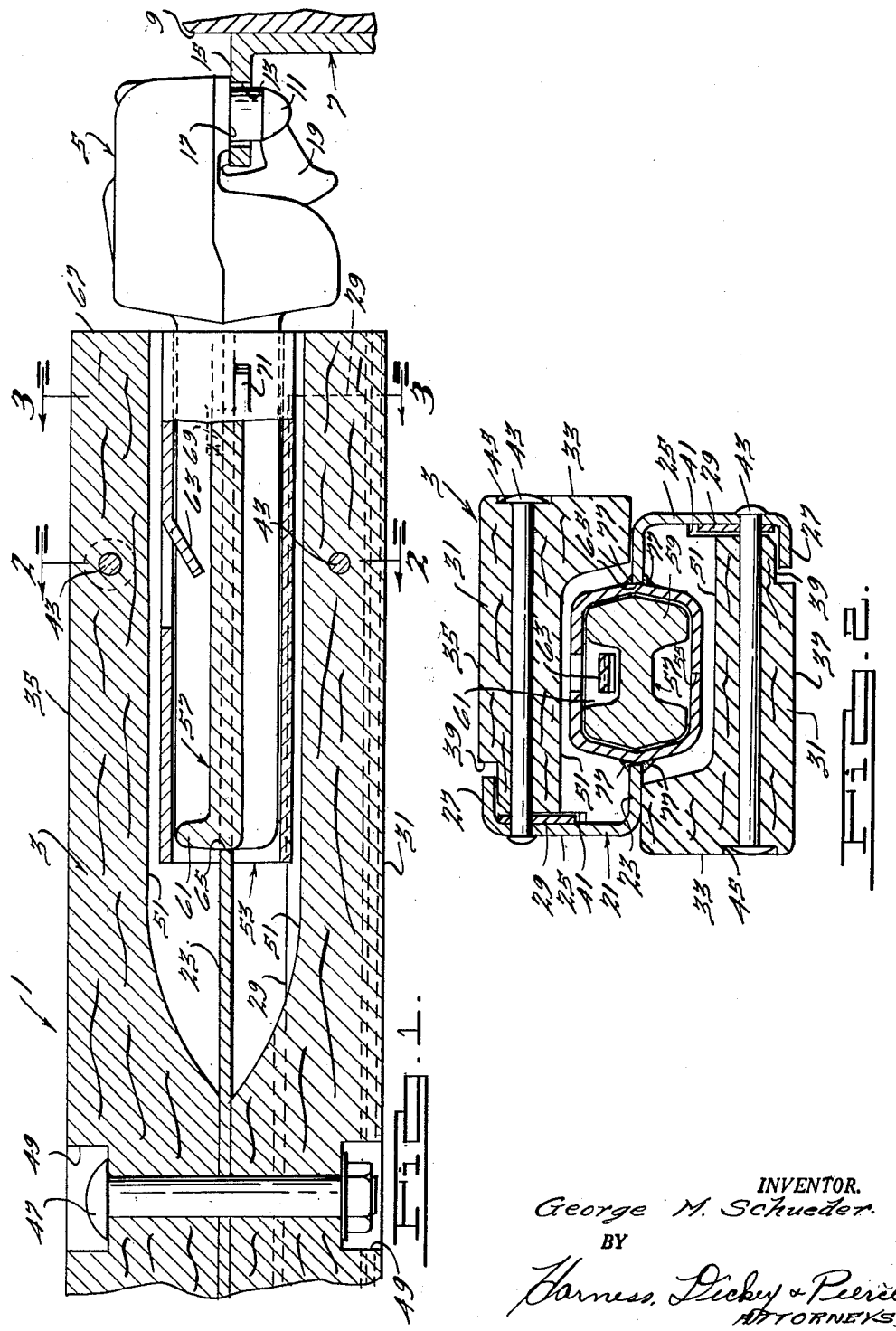
INVENTOR.
George M. Schueder
BY
Harness, Dickey & Pierce
ATTORNEYS June 3, 1958 G. M. SCHUEDER 2,837,039
FREIGHT LOADING CROSS BAR
Filed Feb. 24, 1955 2 Sheets-Sheet 2

INVENTOR.
George M. Schueder
BY
Harness, Dickey & Pierce
ATTORNEYS.

United States Patent Office 2,837,039
Patented June 3, 1958

2,837,039

FREIGHT LOADING CROSS BAR

George M. Schueder, Dearborn, Mich., assignor to Evans Products Company, Plymouth, Mich., a corporation of Delaware Application February 24, 1955, Serial No. 490,265

5 Claims. (Cl. 105—369)

This invention relates to freight bracing cross bars of the type used in railroad boxcars for the purpose of preventing shifting of cargo during transit.

Cross bars of the type referred to are usually, though not always, connected across the width of a boxcar and anchored by fittings at opposite ends to the side walls. Inasmuch as boxcar side walls are of relatively fragile construction compared to the loads to which the railroad rolling stock is subjected, they move in and out, or "breathe," during movement of the car along the railroad tracks. Cross bars have therefore been constructed in such a way that they automatically adjust themselves in length in accordance with the deflection of the side walls and still remain anchored and in operative position. This is done by making the cross bar of a telescopic nature so that the opposite ends can move longitudinally of the bar relative to each other.

It is the object of this invention to provide an improved type of telescopic cross bar which is sturdy enough to withstand the heavy loads and rough handling of freight car usage and which is more economical to manufacture than constructions known heretofore.

The invention accomplishes this and other objects by providing a telescopic connection between one of the end fittings and the body of the cross bar which is noncircular, preferably substantially rectangular, in cross section and comprises a stem sliding in a socket. The socket may be prefabricated and easily secured in place to the main body of the cross bar while the stem may be formed as a part of the locking end fitting at one end of the cross bar.

The invention is illustrated in the accompanying drawings in which:

Figure 1 is a longitudinal side section, partly broken away, of a telescopic end of the cross bar constructed in accordance with the principles of this invention, the end fitting being shown in side elevation and being of the type shown in more detail in U. S. Patent No. 2,497,683 and in U. S. Patent No. 2,725,826;

Fig. 2 is a cross section through the telescopic end of the cross bar shown in Fig. 1 as taken along the line 2—2 of Fig. 1;

Figure 3:
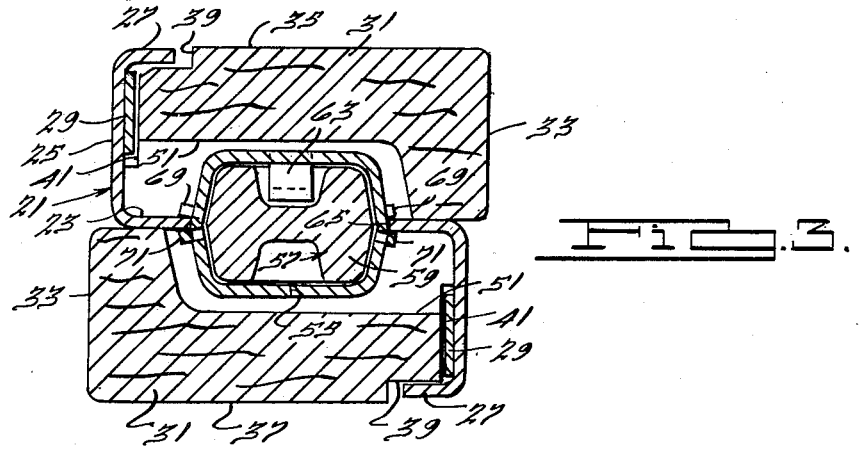
Fig. 3 is a cross section taken along the line 3—3 of Fig. 1.
Figure 4:
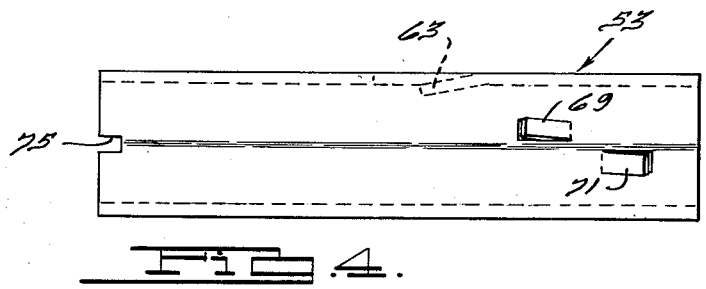
Fig. 4 is a detail side elevation of the socket used in the cross bar shown in Figs. 1–3.
Figure 5:
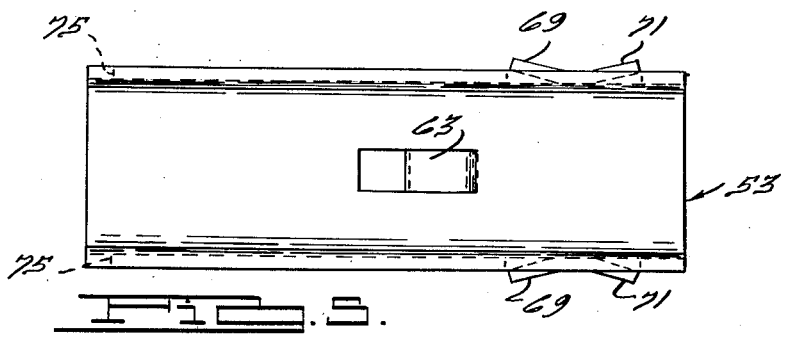
Fig. 5 is a plan view of the socket shown in Fig. 4.

The invention is shown embodied in a type of cross bar that is described in considerably more detail in U. S. Patent Nos. 2,497,683 and 2,725,826, both assigned to the assignee of this invention. Only one end of the cross bar is illustrated in the drawings and it will be understood that both ends of the cross bar can be made identical to the construction shown in Fig. 1 or, alternatively, the unillustrated end of the cross bar can be made of rigid construction so that the telescoping is provided only at the end illustrated herein.

The cross bar 1 which is shown in the drawings comprises generally a main body section 3 and an end fitting 5. The fitting 5 is anchored and supported by belt rails 7 which are secured to the side walls 9 of the freight car. For this purpose, the end fitting 5 has a pair of downwardly projecting pins 11 which fit in holes 13 in the horizontal shelf 15 of the rail 7. The flat surface 17 on the fitting which surrounds the pins 11 rests on the top of the shelf 15 and weight or load from the fitting 5 is transmitted to the belt rails 7, the engagement of the pins 11 in the holes 13 locking the cross bar to the side wall 9 so that the cross bar will deflect along with the side wall. A latch 19 is provided in the fitting 5 and will automatically position itself beneath the shelf 15 so that, unless manually disengaged, it will engage the bottom thereof. In this position, it will prevent the fitting 5 from jumping up high enough to lift the pins 11 out of the holes 13. All of this structure is described in the aforementioned patent and application and constitutes no part of the present invention.

The body 3 of the cross bar is the portion thereof which is adapted to engage the articles of freight that are being shipped. It comprises a main load carrying member and reinforcing metal element 21 which is in the form of a Z or S bar. The reinforcing bar 21 has a central web 23 which lies in or adjacent to the neutral plane in bending of the cross bar under vertical loads. Oppositely turned from the web 23 are legs 25 and inturned from the ends of the legs 25 are flanges 27. Suitably secured by spot welding or otherwise adjacent the outer portions of the legs 25 are moment of inertia increasing reinforcing strips 29 which extend longitudinally of the reinforcing element 21. Upper and lower wooden buffer bars 31 are carried by the metal reinforcing element 21 and these may be of identical construction. The wooden bars 31 are the active cargo bracing elements inasmuch as they are soft enough to actually engage the freight without damaging it and to receive nails and thus provide means for building up various freight storage and bracing arrangements. In order to insure that they rather than metal member 21 engage the freight, the bars 31 project over the adjacent legs 25 of the reinforcing member 21 as will be seen at surfaces 33. In addition the top and bottom surfaces 35 and 37 project above and below, respectively, of the adjacent inturned flanges 27 of the reinforcing member 21. The bars 31 are suitably notched out at 39 and at 41 to receive, respectively, the inturned reinforcing flanges 27 and the reinforcing strips 29. Rivets 43 in suitable apertures through the buffer bars may be provided to extend transversely of the body 3 of the bar and secure the buffer bars 31 to the legs 25 of the reinforcing element 21, the wooden bars being suitably notched out at 45 to receive the heads of the rivets. Additionally, a cross stud 47 may be used to extend through both upper and lower bars 31 and secure them to the web 23 of the reinforcing element 21, the head and the nut of the stud 47 being fitted in suitable recesses 49 in the buffer bars.

Figure 6:
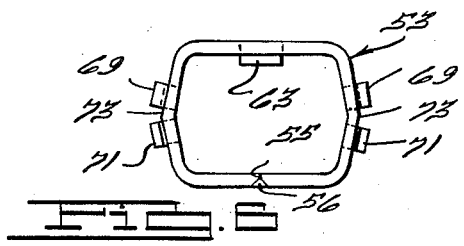
Fig. 6 is an end elevation taken from the right of Fig. 5.

The buffer bars 41 are provided with cutouts 51 of substantial size that open out of one side of the bar and out of the end of the bar as can be seen in Figs. 1 and 2. The cutouts 51 define a recess that houses the sheet metal socket 53 which is preferably formed by bending a flat piece of metal into the cross section shown and welding together the abutting edges along the line 55, the weld being shown at 56 (Fig. 6). The socket 53 is shaped to receive the H-shaped stem 57 that is integral with the end fitting 5. Inasmuch as the stem 57 may be a casting or a forging, the legs 59 of the stem are shown with draft angles and the sides of the socket 53 are shaped to suit and fit the legs 59. It will be seen, however, that the cross section of the socket and of the stem is substantially rectangular. The stem 57 can slide in and out of the socket 53 to vary the over-all effective length of the cross bar. In order to prevent inadvertent removal of the stem 57 from the socket, the top end of the stem is provided with a cross flange 61 and this will engage a down-struck sheared tongue 63 extending downwardly from the top of the socket 53, the tongue being shorter than the hole from which it has been sheared so as to permit a tool to be inserted beneath it and lift it up above flange 61 so that the stem can be removed. It is evident that the fitting 5 can extend no farther away from the body of the bar than is permitted by contact of the flange 61 with the tongue 63.

The socket 53 fits in a cutout or notch 65 that is formed in the web 23 of the reinforcement member 21 and which, in the embodiment illustrated, opens out of the end of the reinforcing member 21, it being noted that the socket, the buffer bars and the reinforcing member 21 all terminate in the same plane indicated at 67 in Fig. 1. The socket 53 is mechanically secured and properly aligned with the body of the bar in the notch 65 by means of oppositely extending outwardly struck ears 69 and 71 on opposite sides 73 of the socket, the ears being spaced from each other by a distance substantially the same as the thickness of the metal forming the web 23, the actual inclination of the sides 73 being somewhat exaggerated in the drawings and in the actual construction the edges of the tabs 69 and 71 can be spaced fairly accurately and lie fairly flat and flush with the surface of the web 23. Further support of the mechanical nature between the socket 53 and the web 23 is provided at the inner end of the socket where a pair of notches 75 in alignment with the space between the ears 69 and 71 are formed in opposite sides 73 of the socket and open out of the ends of the socket. The notches 75 fit over the web 23 at the end of the notch 65 and secure the socket in transverse position to it. After the socket 53 has been aligned on the web 23 so that the web is in the notches 75 and the tabs 69 and 71 lie on opposite sides of the web 23, suitable arc welds may be used along the length of the socket as shown at 77 to permanently secure the socket to the reinforcing member and prevent relative longitudinal movement of the socket and reinforcing member.

While the invention has been described with reference to cross bars for boxcars, it is evident that it is within the spirit of the invention to use the claimed construction in other ways, as vertical bars, for example, and in other cargo spaces for freight, such as in ships, trucks, or warehouses. It is also evident that certain details of construction may be varied, for example the invention is beneficial with forms of support elements other than the Z member 21 shown herein. A particular advantage of the invention lies in reduction of cost of manufacture as it, for one thing, eliminates the need for jigs when securing the telescope tube to the support member. Other advantages and modifications will be apparent to those skilled in the art as being within the purview of the invention.

I claim:

1. A freight bracing cross bar comprising a body portion and a locking head, said body portion including an elongated reinforcing member having a web portion extending across the width of the body portion, a socket secured in a notch in said web portion and opening out of the end of the body portion, said head having a stem telescopically and slidably received in said socket, and tabs struck out of said socket and engaging opposite surfaces of said web and serving to mechanically align said socket with the web.

2. The invention set forth in claim 1 including notches formed in the inner end of the socket and fitting over said web.

3. In a freight bracing cross bar, an elongated body portion including a reinforcing member having a web extending transversely of the body portion, said web having a notch cut out of it, a socket fitting in said notch, means axially spaced along the length of said socket and engaging said web and serving to align the socket with the web, said means comprising notches at one end of said socket fitting over the web and tabs struck out from the sides of the socket and engaging top and bottom surfaces of the web.

4. In a freight bracing bar, an elongated body portion including a metal reinforcement member having a web portion located centrally of the cross section of the body portion and extending transversely thereof, said web portion having a slot therein, a sleeve-like closed wall socket in said slot for telescopically receiving an end fitting for the cross bar, said socket having an outer surface of such width that it is received between opposite sides of the slot, shoulder means formed on the socket intermediate the ends thereof and on opposite sides thereof and engaging opposite sides of said web portion along the length of said slot and serving to mechanically align opposite sides of the socket with the web portion, and shoulder means extending transversely outwardly from said outer surface of the socket so as to overlap said web portion, and means fixedly securing said socket to said reinforcement member.

5. In a freight bracing bar, an elongated reinforcement member with a web extending transversely across the member, said web having a notch formed therein extending lengthwise of the member and opening out of one end of the member, a sleeve-like socket fitted in said notch and extending lengthwise of the member for telescopically receiving an end fitting for the cross bar, said socket having a pair of opposite sides each of which has a notch extending lengthwise of the socket located at the inner end thereof, said notches fitting over said web at the end of the notch in the web to transversely and longitudinally align the socket and web and fix the relative location of the socket on the web so that the outer end of said socket and said one end of said one web have a predetermined lengthwise and transverse relationship, and means at points within the length of said web notch fixedly securing the socket to the web.

References Cited in the file of this patent

UNITED STATES PATENTS

| 2,251,112 | Butler | July 29, 1941 |
| 2,497,683 | Nampa et al. | Feb. 14, 1950 |